United States Patent
Jones et al.

(10) Patent No.: US 7,824,452 B2
(45) Date of Patent: Nov. 2, 2010

(54) POWDER MODIFICATION IN THE MANUFACTURE OF SOLID STATE CAPACITOR ANODES

(75) Inventors: Brady A. Jones, Carson City, NV (US); Colin McCracken, Sinking Spring, PA (US); James Fife, Carson City, NV (US); Ian Margerison, Holmfirth (GB); Tomas Karnik, Lanskroun (CZ)

(73) Assignee: AVX Limited, Devon (GB)

( * ) Notice: Subject to any disclaimer, the term of this patent is extended or adjusted under 35 U.S.C. 154(b) by 15 days.

(21) Appl. No.: 12/377,872

(22) PCT Filed: Nov. 9, 2007

(86) PCT No.: PCT/GB2007/004281

§ 371 (c)(1),
(2), (4) Date: May 19, 2009

(87) PCT Pub. No.: WO2008/056157

PCT Pub. Date: May 15, 2008

(65) Prior Publication Data

US 2010/0067175 A1   Mar. 18, 2010

(30) Foreign Application Priority Data

Nov. 10, 2006   (GB)   ................................ 0622463.8

(51) Int. Cl.
*H01G 9/00*   (2006.01)

(52) U.S. Cl. ...................................... 29/25.03
(58) Field of Classification Search ................. 29/25.03
See application file for complete search history.

(56) References Cited

U.S. PATENT DOCUMENTS 4,154,609 A   5/1979   Hähn (Continued)

FOREIGN PATENT DOCUMENTS

| EP | 1388870 A1 | 2/2004 |
| WO | WO 9830348 A1 | 7/1998 |

OTHER PUBLICATIONS

Search Report and Written Opinion for PCT/GB2007/004281 dated Feb. 20, 2008.

*Primary Examiner*—Alexander G Ghyka
*Assistant Examiner*—Seahvosh J Nikmanesh
(74) *Attorney, Agent, or Firm*—Dority & Manning, P.A.

(57) ABSTRACT

The present invention concerns the field of solid state capacitors and in particular high performance capacitors for use in modern electronic devices. Specifically, the present invention relates to a method by which powders of valve-action material may be modified to make them suitable for use in the formation of capacitor anodes for solid state electrolytic capacitors. According to the present invention there is provided a method of modifying raw valve-action material powder into capacitor grade structured powder comprising: (i) providing a raw powder to be converted; (ii) compressing a portion of the powder to form a porous solid mass of powder (iii) heating the solid mass to a pre-determined sintering temperature and maintaining the temperature for a pre-determined time period to form a sintered body, (iv) pulverising the sintered body to form a processed powder and (v) optionally grading the powder particles within pre-determined size ranges so as to collect capacitor grade powder.

17 Claims, 4 Drawing Sheets

STRUCTURED MIX

U.S. PATENT DOCUMENTS

| | | | |
|---|---|---|---|
| 4,231,790 A | 11/1980 | Hähn et al. |
| 4,347,084 A | 8/1982 | Hähn et al. |
| 4,441,927 A | 4/1984 | Getz et al. |
| 4,483,819 A | 11/1984 | Albrecht et al. |
| 4,555,268 A | 11/1985 | Getz |
| 4,569,693 A | 2/1986 | Albrecht et al. |
| 4,645,533 A | 2/1987 | Izumi |
| 4,684,399 A | 8/1987 | Bergman et al. |
| 4,940,490 A | 7/1990 | Fife et al. |
| 4,945,452 A | 7/1990 | Sturmer et al. |
| 5,198,968 A | 3/1993 | Galvagni |
| 5,234,491 A | 8/1993 | Chang |
| 5,261,942 A | 11/1993 | Fife et al. |
| 5,394,295 A | 2/1995 | Galvagni et al. |
| 5,442,978 A | 8/1995 | Hildreth et al. |
| 5,448,447 A | 9/1995 | Chang |
| 5,470,525 A | 11/1995 | Tripp et al. |
| 5,560,761 A | 10/1996 | Naito |
| 5,580,367 A | 12/1996 | Fife |
| 5,605,561 A | 2/1997 | Iwabuchi et al. |
| 5,954,856 A | 9/1999 | Pathare et al. |
| 5,986,877 A | 11/1999 | Pathare et al. |
| 6,051,044 A | 4/2000 | Fife |
| 6,051,326 A | 4/2000 | Fife |
| 6,079,186 A | 6/2000 | Simon et al. |
| 6,165,623 A | 12/2000 | Fife et al. |
| 6,171,363 B1 | 1/2001 | Shekhter et al. |
| 6,193,779 B1 | 2/2001 | Reichert et al. |
| 6,197,252 B1 | 3/2001 | Bishop et al. |
| 6,231,689 B1 | 5/2001 | Fife |
| 6,238,456 B1 | 5/2001 | Wolf et al. |
| 6,322,912 B1 | 11/2001 | Fife |
| 6,338,816 B1 | 1/2002 | Fife |
| 6,348,113 B1 | 2/2002 | Michaluk et al. |
| 6,358,625 B1 | 3/2002 | Kumar et al. |
| 6,373,685 B1 | 4/2002 | Kimmel et al. |
| 6,375,704 B1 | 4/2002 | Habecker et al. |
| 6,375,710 B2 | 4/2002 | Moore et al. |
| 6,391,275 B1 | 5/2002 | Fife |
| 6,402,066 B1 | 6/2002 | Habecker et al. |
| 6,416,730 B1 | 7/2002 | Fife |
| 6,420,043 B1 | 7/2002 | Fife et al. |
| 6,432,161 B1 | 8/2002 | Oda et al. |
| 6,462,934 B2 | 10/2002 | Kimmel et al. |
| 6,479,012 B2 | 11/2002 | Rao |
| 6,510,044 B1 | 1/2003 | Löffelholz et al. |
| 6,517,645 B2 | 2/2003 | Fife |
| 6,521,173 B2 | 2/2003 | Kumar et al. |
| 6,527,937 B2 | 3/2003 | Fife |
| 6,554,884 B1 | 4/2003 | Tripp et al. |
| 6,558,447 B1 | 5/2003 | Shekhter et al. |
| 6,563,695 B1 | 5/2003 | Suzuki et al. |
| 6,576,038 B1 | 6/2003 | Rao |
| 6,576,099 B2 | 6/2003 | Kimmel et al. |
| 6,592,740 B2 | 7/2003 | Fife |
| 6,616,728 B2 | 9/2003 | Fife |
| 6,689,187 B2 | 2/2004 | Oda |
| 6,702,869 B2 | 3/2004 | Habecker et al. |
| 6,706,240 B2 | 3/2004 | Habecker et al. |
| 6,716,389 B2 | 4/2004 | Tripp et al. |
| 6,751,085 B1 | 6/2004 | Huntington |
| 6,759,026 B2 | 7/2004 | Kimmel et al. |
| 6,775,127 B2 * | 8/2004 | Yoshida ..................... 361/528 |
| 6,788,525 B2 | 9/2004 | Suzuki et al. |
| 6,821,314 B1 | 11/2004 | Reichert et al. |
| 6,835,225 B2 | 12/2004 | Naito et al. |
| 6,849,292 B1 | 2/2005 | Huntington |
| 6,876,542 B2 | 4/2005 | Oda et al. |
| 6,893,513 B2 | 5/2005 | Michaluk et al. |
| 6,896,715 B2 | 5/2005 | Fife |
| 7,066,975 B2 | 6/2006 | Oda et al. |
| 7,066,979 B2 | 6/2006 | Löffelholz et al. |
| 7,142,408 B2 | 11/2006 | Wang |
| 7,149,074 B2 | 12/2006 | Kimmel et al. |
| 7,156,893 B2 | 1/2007 | Habecker et al. |
| 7,157,073 B2 | 1/2007 | Motchenbacher et al. |
| 7,204,866 B2 | 4/2007 | Oda et al. |
| 7,210,641 B2 | 5/2007 | Kitchell et al. |
| 7,354,472 B2 | 4/2008 | Shekhter et al. |
| 7,381,396 B2 | 6/2008 | Thomas et al. |
| 7,410,609 B2 | 8/2008 | Schnitter |
| 7,419,926 B2 | 9/2008 | Schnitter et al. |
| 7,431,751 B2 | 10/2008 | Shekhter et al. |
| 7,431,782 B2 | 10/2008 | Michaluk et al. |
| 7,445,762 B2 | 11/2008 | Fife |
| 7,473,294 B2 | 1/2009 | Oda et al. |
| 7,485,257 B2 | 2/2009 | Löffelholz et al. |
| 7,515,397 B2 | 4/2009 | Reed et al. |
| 2005/0002854 A1 | 1/2005 | Motchenbacher et al. |
| 2007/0172377 A1 | 7/2007 | Fife et al. |

* cited by examiner

RANGE: 300RF mm   BEAM: 2.40 mm   SAMPLER: MS14   OBS: 15.8%
PRESENTATION: 3$$D   ANALYSIS: POLYDISPERSE   RESIDUAL: 1.472%
MODIFICATIONS: NONE

CONC. = 0.0027%VOL   DENSITY= 1.000g/cm^3   S.S.A.=5.2860m^2/g
DISTRIBUTION: VOLUME   D(4, 3)= 1.75 um   D(3, 2)= 1.14 m
D(v,0.1) = 0.57μm   D(v, 0.5)= 1.48μm   D(v, 0.9)= 3.30μm
SPAN = 1.841E+00   UNIFORMITY= 5.740E-01

| SIZE (μm) | VOLUME UNDER% | SIZE (μm) | VOLUME UNDER% | SIZE (μm) | VOLUME UNDER% |
|---|---|---|---|---|---|
| 0.05 | 0.00 | 0.67 | 14.41 | 9.00 | 100.0 | 120.67 | 100.0 |
| 0.06 | 0.00 | 0.78 | 19.52 | 10.48 | 100.0 | 140.58 | 100.0 |
| 0.07 | 0.00 | 0.91 | 25.54 | 12.21 | 100.0 | 163.77 | 100.0 |
| 0.08 | 0.00 | 1.06 | 32.47 | 14.22 | 100.0 | 180.90 | 100.0 |
| 0.09 | 0.00 | 1.24 | 40.16 | 16.57 | 100.0 | 222.28 | 100.0 |
| 0.11 | 0.00 | 1.44 | 48.34 | 19.31 | 100.0 | 258.95 | 100.0 |
| 0.13 | 0.00 | 1.68 | 56.74 | 22.49 | 100.0 | 301.68 | 100.0 |
| 0.15 | 0.00 | 1.95 | 65.15 | 26.20 | 100.0 | 351.46 | 100.0 |
| 0.17 | 0.00 | 2.28 | 73.31 | 30.53 | 100.0 | 409.45 | 100.0 |
| 0.20 | 0.00 | 2.65 | 81.03 | 35.56 | 100.0 | 477.01 | 100.0 |
| 0.23 | 0.01 | 3.09 | 87.59 | 41.43 | 100.0 | 555.71 | 100.0 |
| 0.27 | 0.36 | 3.60 | 92.71 | 46.27 | 100.0 | 647.41 | 100.0 |
| 0.31 | 1.15 | 4.19 | 96.29 | 56.23 | 100.0 | 754.23 | 100.0 |
| 0.36 | 2.45 | 4.88 | 98.50 | 65.51 | 100.0 | 878.67 | 100.0 |
| 0.42 | 4.35 | 5.69 | 99.62 | 76.32 | 100.0 | | |
| 0.49 | 6.91 | 6.63 | 100.0 | 88.91 | 100.0 | | |
| 0.58 | 10.23 | 7.72 | 100.0 | 103.58 | 100.0 | | |

FIG.1

RAW POWDER

STRUCTURED MIX

POWDER MODIFICATION IN THE MANUFACTURE OF SOLID STATE CAPACITOR ANODES

RELATED APPLICATIONS

The present application is a U.S. national phase filing of PCT/GB2007/004281 filed on Nov. 9, 2007, which claims priority to GB Patent Application No. 0622463.8 filed on Nov. 10, 2006.

The present invention concerns the field of solid state capacitors and in particular high performance capacitors for use in modern electronic devices. Specifically, the present invention relates to a method by which powders of valve-action material may be modified to make them suitable for use in the formation of capacitor anodes for solid state electrolytic capacitors. Essentially the invention provides a method by which raw (non-structured) powder may be converted into a structured powder, and further provides powders obtained or obtainable by this method.

Solid state capacitors are currently manufactured using a powder metallurgical process in which a high surface area porous anode body is formed by sintering of valve-action metal or ceramic powders. Typical valve action materials are tantalum or niobium metal or sub-oxides of niobium (such as niobium monoxide which is a conducting ceramic having valve-action properties). Although the aforementioned materials are the most common, other valve action materials will be known to the person skilled in the art.

The porous anode body provides a high surface area to volume, which thus provides the potential for high specific capacitance in the final capacitor. In order to obtain the best properties, the porosity must be carefully controlled to allow the formation of an effective capacitor. Porosity of the anode body may be influenced by the size and particle distribution ("structure") of the precursor powder which when sintered forms the porous anode body. Other influences on porosity include micro-porosity and shape of fine particles of precursor powder, the level of pre-agglomeration, the size and distribution of original agglomerates, the chemistry of the powder material, crystallinity, the sinter activity of the powder, pressing force used to form the green anode bodies, type of lubrication used during forming, and the binders admixed with the powder. Nevertheless, unless the structure of the precursor powder is suitable it will be difficult to obtain anode bodies with optimum porosity. For certain materials it is extremely difficult to obtain powders of the required structure. For example, niobium monoxide is very brittle and during powder formation by milling forms extremely fine powder which is unsuitable for use in sintering to form anode bodies for use in capacitor manufacture.

Capacitor grade powder is typically referred to in the art as "structured powder". U.S. Pat. Nos. 6,322,912; 6,391,275 and 6,592,740 disclose chemical methods for forming NbO powders for use in forming capacitors. In these solid state disproportionation reactions for forming NbO powders, the precursors are $Nb_{(0)}$ and the stable oxide $Nb_2O_5$. These agents are powdered to a primary particle size of 1 micron or less and mixed in the stoichiometric proportions required to produce niobium monoxide. The mixture is heated to a temperature of about 1400 degrees centigrade in a hydrogen or hydrogen/argon atmosphere and reacted for several hours. The pentoxide is thereby reduced to its sub-oxides and the metal is oxidised by released oxygen until both pentoxide and metal are transformed to the monoxide NbO. The agglomerated NbO is then ground which due to the brittleness of the material produces about 2 micron size fines.

Precursor Nb metal may be produced by various methods. One is the alumino-thermic reduction of $Nb_2O_5$. This involves igniting a mixture of aluminum and the niobium pentoxide. The niobium pentoxide is reduced through its oxidation states to $Nb_{(0)}$ metal and the aluminum is oxidised to alumina ($Al_2O_3$). The alumina powder is washed away and the metal niobium is purified, for example by electron beam heating. An ingot of the niobium may then be formed into a powder by milling. Milling is facilitated by embrittlement of the niobium by exposure to hydrogen. An alternative reduction route to obtain Nb metal is as follows:

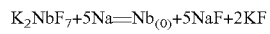

A magnesium reduction/purification process may then be used to obtain Nb powder. U.S. Pat. No. 6,131,062 discloses a two stage reduction process by which niobium metal is produced from the stable oxide precursor.

The stable pentoxide $Nb_2O_5$ may be formed by a method which involves precipitation of $Nb(OH)_5$ from aqueous $H_2NbF_7$ by addition of $NH_4OH$ solution. The niobium hydroxide may then be separated from solution and calcined to form the pentoxide. An alternative methodology simply involves the controlled oxidation of niobium metal.

It will be appreciated that the process for forming structured capacitor grade NbO powder is rather expensive and energy-inefficient since it involves multiple reaction steps, heating and milling processes.

An alternative process for forming niobium monoxide has been developed by Reading Alloys and is described in US-A-2005/0002854 and US-A-2004/0219094. This involves the alumino-thermic smelting of a mixture of niobium pentoxide and aluminum. The niobium is mixed with niobium pentoxide in proportions required to form a 1:1 stoichiometric ratio of Nb:O. An electron beam furnace is then used to melt and react the mixture to form solid NbO. The NbO ingot is then crushed and milled. This method is considerably cheaper than the chemical methods mentioned above. However the powder is unsuitable in its raw state for use in forming capacitor anodes. Raw powder inherently has very poor physical characteristics, which include negligible flowability, very low green crush strength in post-compressed powder mass, high shrinkage during sintering, and low internal porosity in the final sintered body, which reduces specific surface area and therefore capacitance in a final capacitor.

U.S. Pat. No. 6,479,012 and U.S. Pat. No. 6,576,038 each disclose a method for agglomerating tantalum and niobium metal powders so as to form modified powders which are optimized for use in solid state capacitor manufacture. This method is essentially a wet casting method in which the raw powder is mixed with about 30 to 50 weight % of a volatile liquid such as water. The wet powder sludge is compacted in a container by vibration and allowed to settle. Excess water is decanted off. The cake of compacted powder is then dried at raised temperature and under a 40 Torr vacuum. The dried cake is then heat treated at relatively high temperature (i.e. sintered) to form an integrated porous cake. This cake is then milled or crushed to form a fine powder for use as niobium or tantalum capacitor anodes.

There are various problems with this wet treatment methodology. The vibration-compacted powder sludge cakes are still relatively low density, due to the use of vibration and the presence of significant amounts of water in the powder. This produces a rather low strength sintered cake. The drying by heat/vacuum evaporation is difficult to control and it is difficult to achieve homogenous drying. As a result a crust typically forms on the drying cake. This results in a lack of uniformity in strength in the sintered cake. Furthermore the method is not suitable for processing niobium oxide powders, which have a very low green strength so that sintering becomes problematical.

The present inventors have addressed the problem of providing an improved method for modifying raw valve action powders to make them suitable for use in the manufacture of capacitor anodes. Specifically, a preferred aspect of the present invention provides a general method for modifying niobium oxide powders for use in capacitor manufacture.

According to the present invention there is provided a method of converting raw valve-action material powder into capacitor grade structured powder. Essentially the process involves compressing and sintering the raw powder to form a solid mass of powder and mechanically disintegrating the solid mass to form a processed powder which may be graded to provide a capacitor grade powder product. By "raw powder" the applicant means any powder which requires particle size modification in order to make it suitable for solid state capacitor manufacture.

Hence according to one aspect of the invention there is provided a method of modifying raw valve-action material powder into capacitor grade structured powder comprising:
 (i) providing a raw powder to be converted;
 (ii) compressing a portion of the powder to form a porous solid body of powder
 (iii) heating the solid body to a pre-determined sintering temperature and maintaining the temperature for a pre-determined time period to form a sintered body, and
 (iv) disintegrating the sintered body to form a processed powder.

The method preferably further comprises: step (v) grading the powder particles within pre-determined size ranges so as to collect capacitor grade powder. The grading step (v) may be carried out using a fine screen which permits separation of small powder particles below a size threshold. These removed small particles may be returned to the raw powder supply. The grading step (v) may also be carried out using a coarse screen which separates large powder particles above a size threshold. The removed large particles may be returned either to the raw powder supply or to a means for pulverising in step (iv).

According to another aspect of the invention, the sintering step (iii) is preferably repeated at least once to modify the structure of the sintered body. Preferably the sintering step (iii) is repeated just once so that two sinters are conducted on the body. At least one of the sintering conditions in step (iii) may be modified for the repeated sintering step. In a preferred method a first sintering is conducted at a first sintering temperature and a second sintering is conducted at a second sintering temperature, wherein the first sintering temperature is lower than the second temperature. The first sintering is conducted at a temperature between 700 to 1300° C. The second sintering may be conducted at a temperature of between 900 and 1600° C. Generally, the sintering temperature in step or steps (iii) is between 700 and 1600° C.

The term "valve action material" as used herein is meant to cover any suitable material, including metals, metal oxides or alloys exhibiting the ability to form an electrically insulating film under appropriate conditions. Examples of valve materials include Ta, Nb, Hf, Zr, Ti, V, W, Be, or Al, and the alloys and oxides thereof.

In a highly preferred embodiment, the raw valve action material powder is a raw metal oxide valve action material powder.

Preferably, the metal oxide valve action material comprises metal and oxygen with a metal to oxygen atomic ratio of between 1:0.5 and 1:1.5. More preferably the metal oxide valve action material comprises metal and oxygen with a metal to oxygen atomic ratio of between 1:0.6 and 1:1.4. More preferably the metal oxide valve action material comprises metal and oxygen with a metal to oxygen atomic ratio of between 1:0.7 and 1:1.3. More preferably the metal oxide valve action material comprises metal and oxygen with a metal to oxygen atomic ratio of between 1:0.8 and 1:1.2.

The raw powder preferably comprises niobium sub-oxide valve action material. However the method may be used to modify other valve action powders such as tantalum or niobium metals. The powder may include other additives to optimise properties, such as nitrogen.

Preferably, the niobium sub-oxide valve action material comprises niobium and oxygen with a niobium to oxygen atomic ratio of between 1:0.5 and 1:1.5. More preferably the niobium sub-oxide valve action material comprises niobium and oxygen with a niobium to oxygen atomic ratio of between 1:0.6 and 1:1.4. More preferably the niobium sub-oxide valve action material comprises niobium and oxygen with a niobium to oxygen atomic ratio of between 1:0.7 and 1:1.3. More preferably the niobium sub-oxide valve action material comprises niobium and oxygen with a niobium to oxygen atomic ratio of between 1:0.8 and 1:1.2.

In a preferred embodiment the raw powder comprises niobium monoxide. Typically the processed powder has a larger average particle size than the raw powder.

In yet another aspect of the invention there is provided a processed powder obtained by the method as hereinbefore described.

In another aspect of the invention them method further comprises forming a solid state capacitor anode from the graded powder by sintering the powder into an anode form. Subsequent to sintering, the anode body is preferably anodized to form a surface layer of electrically insulating oxide. These further processing stages are well known to persons in the field of solid state capacitor manufacture, so are not described in detail in this patent specification. The invention thus also provides capacitor anodes obtained by this method.

The present invention allows, in particular, powders having large proportions of particles which are too fine for capacitor use to be modified for use in capacitor anode manufacture. Thus the method provides a way of increasing the mean particle size of raw powders which are too fine for the intended application. The method may be applied to any raw valve-action material powder, but is particularly suitable for use with conductive niobium sub-oxides, such as monoxides. These are very difficult to process by conventional methods to obtain large enough powder particle grains.

Typically the compressing step is carried out in a mechanical press, such as a conventional powder metallurgical die/press apparatus. The compressing process typically involves the use of a pressing lubricant. This is either admixed with the raw powder before the compressing step, or is applied to compressing machinery surfaces and thereby contacts surfaces of the solid mass of powder during pressing, while the bulk powder remains substantially lubricant-free or "dry".

When a lubricant is used the pressed solid mass of powder may be subject to a preheating step before sintering, which step serves to thermally decompose and remove any lubricant remaining in or on the solid mass. Other methods of lubricant removal may however be used, such as chemical leeching/washing. The pre-heating is typically carried out at a temperature below the sintering temperature in a low oxygen atmosphere.

The sinter heating step (iii) is repeated or cycled one or more times. The degree to which cycling occurred may be altered in order to alter the sintered structure and thereby the properties of the disintegrated powder obtained from the sintered structure. The sintering process results in the formation of an integrated porous body of fused powder material. Repeated sintering modifies the degree to which adjacent particles coalesce or are connected, for example by migration of material to larger particles or thicker neck portions at contact points of adjacent particles.

The integrated porous bodies produced are subject to a mechanical disintegration step (iv). This may be carried out using known techniques such as grinding, milling, crushing or pulverising. This produces a powder made up of particles or grains broken off from original porous body.

The present invention offers a low cost alternative method of forming structured capacitor grade powders. Raw powders of material suitable for use in solid state capacitors are relatively cheap, but are typically unsuitable for use in capacitor anode formation without further processing. Present sources of capacitor grade powders are typically extremely expensive and even then may not be ideal for the particular application envisaged. The present invention allows relatively cheap, raw powder of poor physical characteristics to be cheaply and conveniently modified to render it suitable for forming of capacitor anode pellets. By controlling or varying the pressing step and/or sintering step or steps the final powder properties (such as particle size) may be varied. This method has the advantage of having general application for solid state materials used in powder metallurgical routes for forming capacitor bodies (i.e. pellets). The method is particularly suitable for modifying conductive niobium sub-oxides of the type described in the prior art mentioned above. These are particularly difficult to modify by prior art methods, and in raw form are typically unsuitable for capacitor manufacture.

Control of the compaction press density, heat treatment temperature profile, crushing, classification (grading) and number of repeat cycles may all be used to contribute to the creation of an optimized structured powder with suitable physical characteristics for use in solid electrolytic capacitor manufacturing.

Following is a description, with reference to the figures and by way of example only, of methods for putting the present invention into effect.

RAW POWDER

Figure 1:
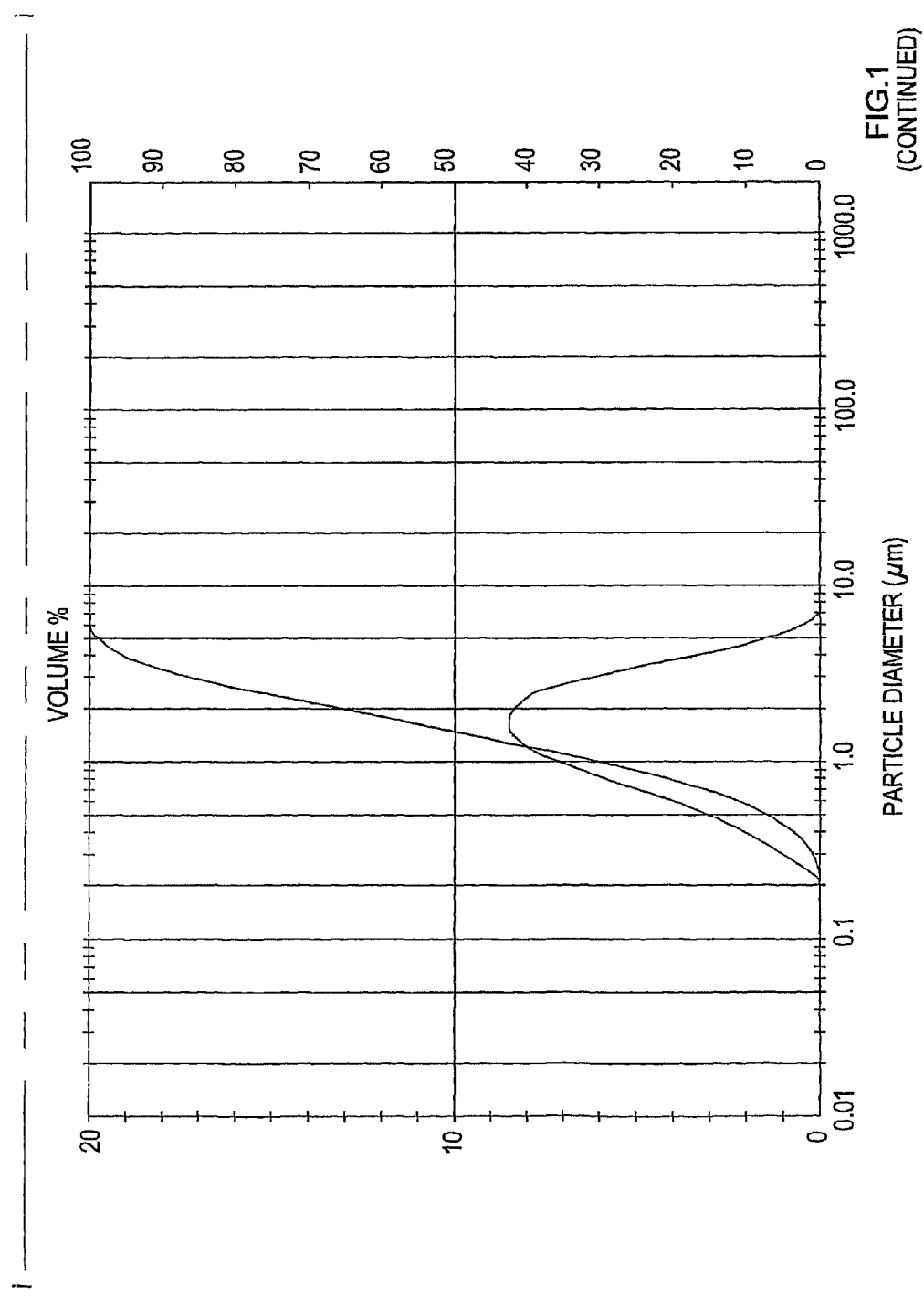
FIG. 1 is a graph showing the particle size and distribution characteristics for raw unstructured niobium monoxide powder.
Figure 3:
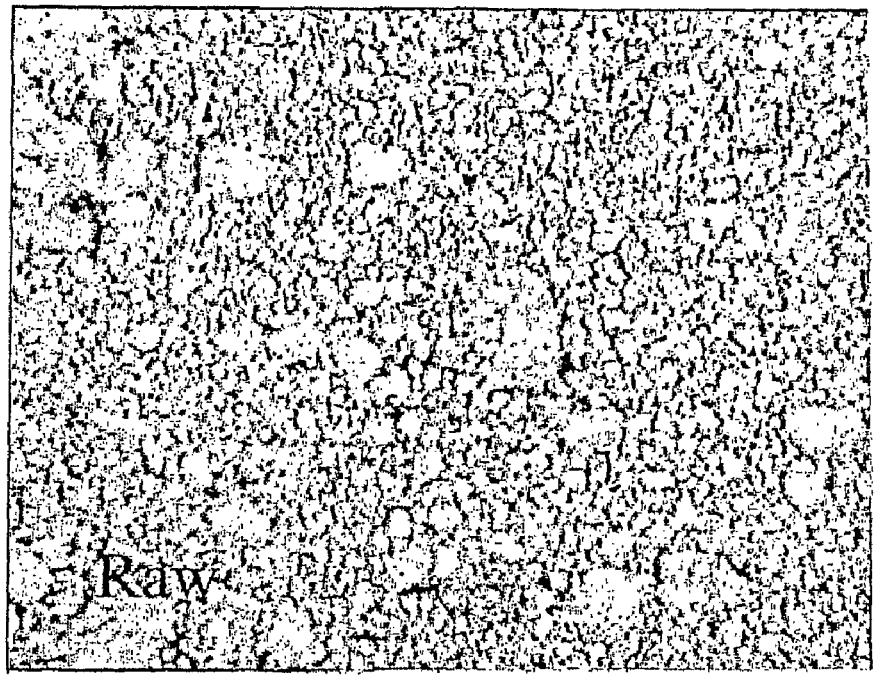
FIG. 3 is a photomicrograph showing the appearance of raw NbO powder.

Any source of raw valve action niobium oxide may be used where a modification of the powder particle structure is required. In the present case conventionally milled niobium oxide is used as the source, obtained from a supplier which uses an alumino-thermic NbO production route. The appearance, properties and particle size distribution characteristics of this powder are illustrated in FIGS. 1, 3 and Table I, first data column. The average particle size for this niobium oxide powder is very fine; about 1.5 microns. The $90^{th}$ percentile upper size limit is about 3.3 microns and the lower $10^{th}$ percentile limit is about 0.57 microns. This powder is too fine for processing to form capacitors by conventional powder metallurgical routes.

Briquette Formation

Raw non-structured niobium monoxide powder is compacted, by use of a conventionally configured die/punch pressing machine. The raw powder is admixed with a binder in an amount of 2% by weight. The target density is about 2.2 to 3.8 g/cc after pressing. Many individual briquettes are formed each having a mass of about 10 g.

The pressing machine is also provided with a die wall lubrication mechanism which applies a thin deposit of lubricant (Polyethylene Glycol—PEG400) to the interior die wall surfaces and/or pressing punch.

The powder is then pressed to a form a "briquette" of target density and uniformity. The pressed "green" briquettes are then pre-heated to remove the lubricant PEG400 by thermal decomposition. The pre-heating involves heating the green briquettes under a nitrogen atmosphere for about 4 hours and to a peak temperature of about 450 degrees C. until all of the PEG400 has evaporated.

The briquettes are then heat treated in a linear type sinter furnace in which bodies pare passed through a hot zone on a conveyor. The heating continues for 10 minutes at 800 degrees C. This produces sintered porous briquettes. The sintering is repeated at an increased temperature of 1250 degrees centigrade, for the same amount of time. This further modifies the structure of the briquette, in particular modifying the neck size between agglomerated particles Generally, repeating the sintering increases the amount of powder particle agglomeration and coalescence. This decreases the pore volume in the briquette but helps produce an open structure. The absolute temperature of sintering and length of time spent in sintering may also be used to modify the briquette structure.

Powder Structuring

After sintering the briquettes are mechanically disintegrated by known methods such as mortar grinding, ball screening, jaw milling, hammer milling, conical milling, disc milling, wheel milling etc. This produces a coarse raw powder of increased average particle size as compared to the raw powder.

First Disintegrating Method

A plurality of briquettes of about 10 g mass each are gathered to form a total mass of greater than 1.5 kg. The briquettes are inserted into a screening/milling machine with 0.5 kg of 10 mm zirconium oxide balls. The powder is crushed by the balls over a screen of 425 microns. The vibration amplitude is 5 mm and the frequency is 25 Hz. The screened powder is graded using screen sizes of 300 microns and 68 microns. The fraction collected is that which is retained by the 68 micron screen and that which passes through the 300 microns screen. A typical particle size and distribution graph is shown in FIG. 3. This shows two peaks. The primary peak corresponds to particle sizes of about 65 to just under 600 microns. The larger upper end is thought be a result of the non spherical, elongate shape of the large particles, which may therefore have a small diameter in one axis which permits passing through the 300 micron screen. The powder and grains collected by the 300 micron screen are returned back to the mill. The fraction passing through the 68 microns screen is returned to the raw powder supply for a fresh briquetting process.

Second Disintegrating Method

If the total weight of briquettes is greater than 5 kg, the briquettes are inserted in to a conical mill "Quadro Comil 197" having a screen diameter of 127 mm. The briquettes are crushed using a milling frequency 1500 rpm. The crushed powder is graded using a screening machine with screen sizes 300 um and 68 um, as before with rejected powder returned to the mill or the raw briquette feed, as for the first method.

The modified powders were then used to form solid state capacitor anodes from the graded powder by sintering the powder into multiple niobium monoxide anode pellets.

Figure 2:
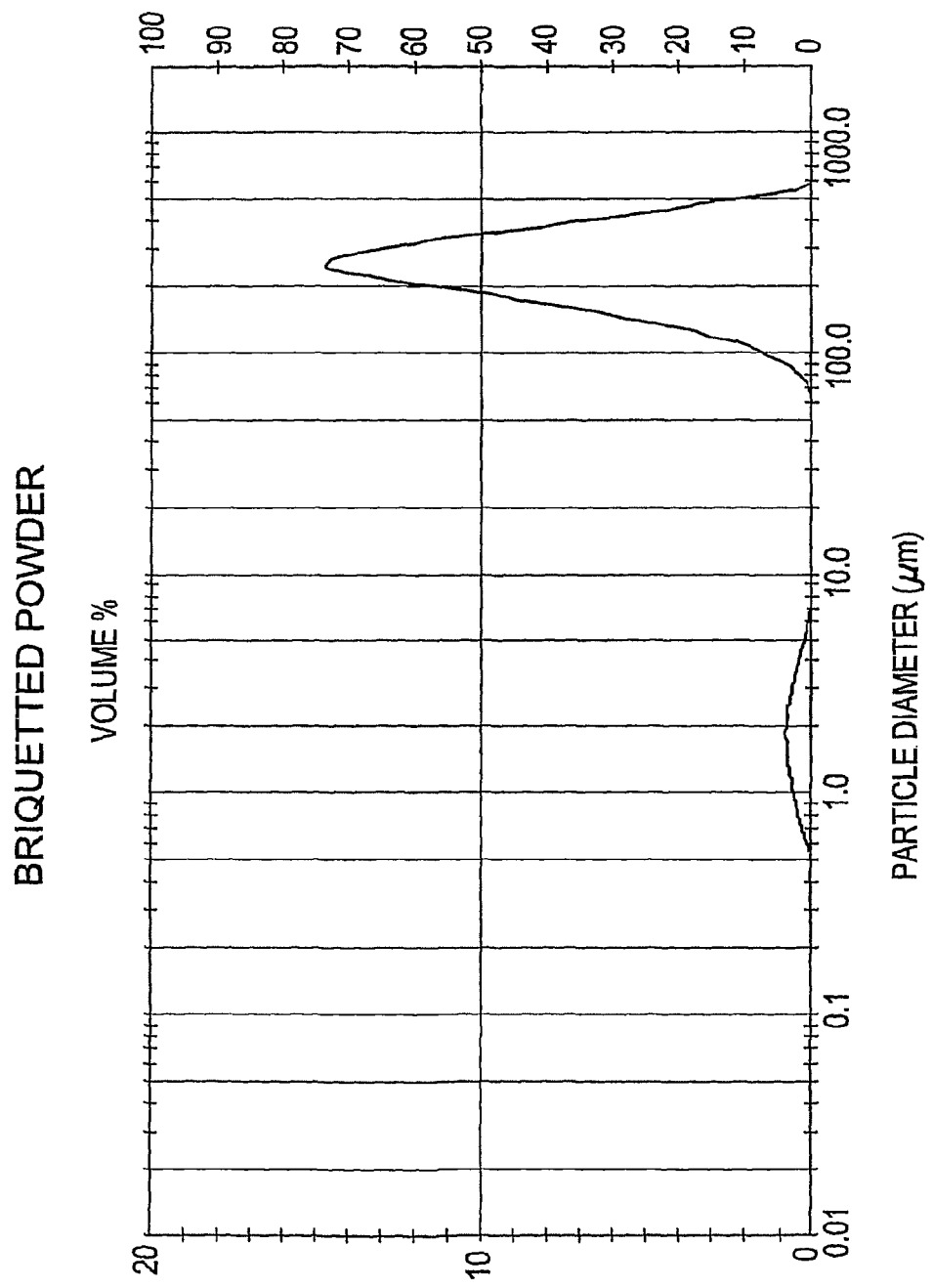
FIG. 2 is a graph showing the particle size and distribution characteristics for niobium monoxide powder modified according to the present invention.
Figure 4:
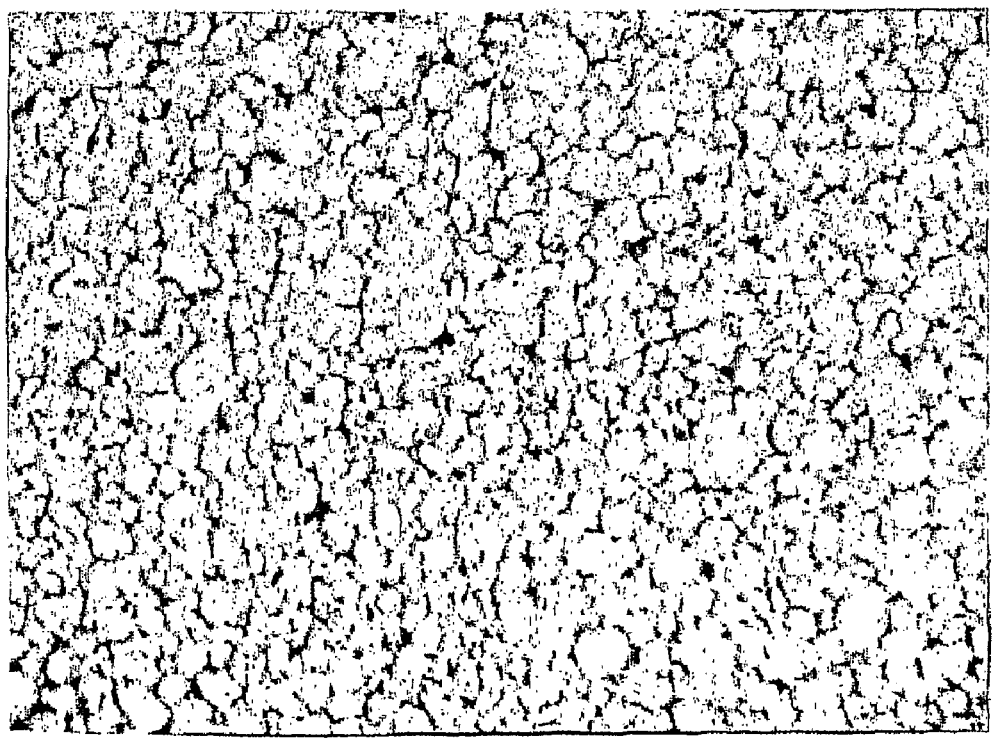
FIG. 4 is a photomicrograph showing the appearance of processed NbO powder modified according to the present invention.

FIGS. 2 and 4 show the extent to which the powder grain structure may be modified in a process according to the present invention. The powder according to the graph in FIG. 2 shows that there is a distribution of particles sizes predominantly in the range 60 to 600 microns, with a minor amount of fine particles in the range 0.5 to 7 microns. By contrast, the unstructured powder has a particle size distribution of between 0.25 to 7 microns with $D_{(50)}$ around 1.5 microns. Thus the present embodiment results in a significant increase in particle mean size.

Powder Properties

The improvements in physical characteristics of the structured powder were investigated by conventional methodologies, in the context of suitability for the manufacture of anode bodies in solid state capacitors. The results presented in the following table are representative of the improvements available by using the present invention to modify the structure of the raw powder:

TABLE I

| Characteristic | Non-structured Powder | Structured Powder |
| --- | --- | --- |
| Flowability of powder | Negligible | 1.8 g/sec |
| Green crush strength of anode body | Negligible | 0.03 Kg @ 2.6Dp |
| Shrinkage of anode body during sinter (Dp = 2.8 g/cc) | 25% | 5% |
| Grain size PSD ($D_{50}$) | 1.48 μm | 226 μm |
| Final anode body porosity (Cum. Vol. >1.5 um) | 12.1% | 44.3% |
| Carbon content | 308 ppm | 169 ppm |

The above results show that the raw powder, which is unsuitable for capacitor manufacture, may be modified according to the present invention to provide a structured powder of great suitability for capacitor manufacture. The flowability of the modified powder is relatively high, which allows the reliable delivery of measured quantities of powder into pellet pressing machines. The green crush strength is higher, which permits manipulation and transport of the green anode bodies during processing. The shrinkage during sintering is less, thereby permitting more accurate dimensional control and indicating maintenance of good porosity in the sintered anode bodies. The grain size of the powder is increased to levels which allow the proper impregnation of anodes during subsequent processing. The porosity is markedly improved which indicates an open structure which allows easy impregnation of liquid cathode layer precursor materials during subsequent processing. The carbon content is a measure of the amount of lubricant left after the preheating step. Carbon contaminant is to be reduced as much as possible as it causes a break down in electrical properties of the final capacitor. The structured powder of the present invention is far less prone to residual contamination because of the open pore structure that aids evaporation of the binder from internal surfaces.

The present inventors have found that by using a sintering and disintegration stage according to the present invention it is surprisingly possible to obtain a structured powder suitable for use in capacitor anode manufacture. The invention may be used for any valve action powder which requires structuring, but is especially suitable for use in re-grading NbO powder. This allows NbO powder from a wide range of sources to be used in the manufacture of high performance capacitors.

The invention claimed is:

1. A method of modifying raw valve action material powder into capacitor grade structured powder comprising:
   compressing a portion of a raw powder to form a porous solid body;
   heating the solid body to a first sintering temperature to form a sintered body, and
   disintegrating the sintered body to form a processed powder, further comprising:
   grading the processed powder to remove particles within a pre-determined size range so as to collect a capacitor grade powder.

2. A method as claimed in claim 1 wherein the grading is carried out using a fine screen which removes small powder particles below a size threshold.

3. A method as claimed in claim 2 wherein the removed small powder particles are returned to a supply of the raw powder.

4. A method as claimed in claim 1 wherein the grading is carried out using a coarse screen which removes large powder particles above a size threshold.

5. A method as claimed in claim 4 wherein the removed large powder particles are returned either to a supply of the raw powder or to an apparatus for disintegrating the sintered body.

6. A method as claimed in claim 1 further comprising heating the sintered body to a second sintering temperature to modify the structure of the sintered body.

7. A method as claimed in claim 6 wherein the first sintering temperature is lower than the second sintering temperature.

8. A method as claimed claim 6 wherein the first sintering temperature is between about 700 to about 1300° C. and the second sintering temperature is between about 900 and about 1600° C.

9. A method as claimed in claim 1 wherein the sintering temperature is between about 700 to about 1600° C.

10. A method as claimed in claim 1 wherein the raw powder comprises niobium sub-oxide valve action material.

11. A method as claimed in claim 1 wherein the raw powder comprises niobium monoxide.

12. A method as claimed in claim 1 wherein the processed powder has a larger average particle size than the raw powder.

13. A method as claimed in claim 1, further comprising forming a solid state capacitor anode from the graded powder by sintering the powder into an anode form.

14. A method as claimed in claim 13, further comprising anodizing the capacitor anode to form a surface layer of electrically insulating oxide.

15. A capacitor anode obtained by the method of claim 14.

16. A capacitor comprising an anode as claimed in claim 15.

17. A processed powder obtained by the method of claim 1.

* * * * *